United States Patent [19]

Milne

[11] 4,221,620
[45] Sep. 9, 1980

[54] METHOD OF PROVIDING SUB-FLOOR WITH DECORATIVE FLOOR PANELS

[75] Inventor: James A. Milne, Wheeling, Ill.

[73] Assignee: Pace Incorporated, Northbrook, Ill.

[21] Appl. No.: 885,472

[22] Filed: Mar. 13, 1978

[51] Int. Cl.$^2$ .......................... B32B 31/04; C09J 5/06
[52] U.S. Cl. ...................... 156/71; 156/152; 156/247; 156/272; 156/320; 156/344; 156/499; 156/574; 156/584
[58] Field of Search ................. 156/71, 152, 272, 306, 156/320, 344, 499, 574, 584, 579, 576, 275, 578, 247, 309; 144/310 R, 310 B, 313

[56] References Cited

U.S. PATENT DOCUMENTS

| | | | |
|---|---|---|---|
| 2,084,625 | 6/1937 | Stebbins et al. | 156/499 |
| 2,655,976 | 10/1953 | Lovin | 156/584 |
| 2,709,742 | 5/1955 | Perry | 156/574 |
| 3,348,641 | 10/1967 | Gage | 156/275 |
| 3,733,231 | 5/1973 | Rutkowski et al. | 156/71 |
| 3,976,533 | 8/1976 | Strauven | 156/574 |

Primary Examiner—Michael G. Wityshyn
Attorney, Agent, or Firm—Wegner, Stellman, McCord, Wiles & Wood

[57] ABSTRACT

A method of laying large surfacing and/or decorative floor panels or sheets upon a sub-floor with hot melt adhesives which have no solvents but are activated by heat and bond immediately upon loss of heat to a predetermined level, which method provides steps of running an adhesive undercoated 4×8 foot sheet, for example, over a low profile heater on the sub-floor, and pressing the sheet to a preselected desired position on the sub-floor before the adhesive cools to mechanical bonding temperature and including removal of damaged or mislaid sheets by inverting the heater and running over the exposed sheet surface to heat the underlying adhesive to an elevated release temperature so manual lifting can remove the sheet without damage to the sub-floor.

10 Claims, 2 Drawing Figures

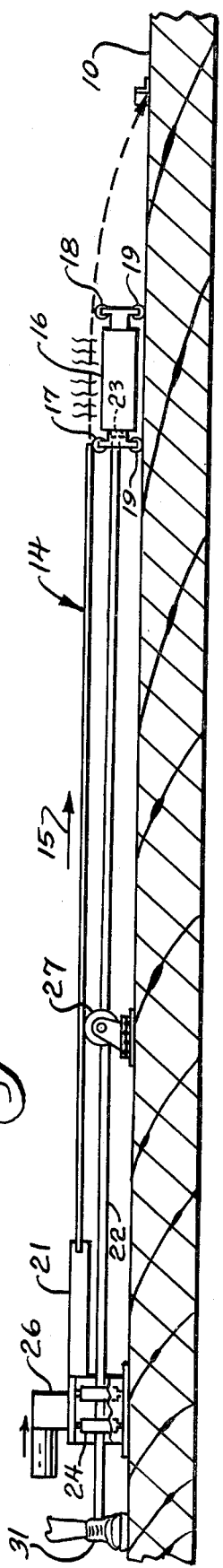
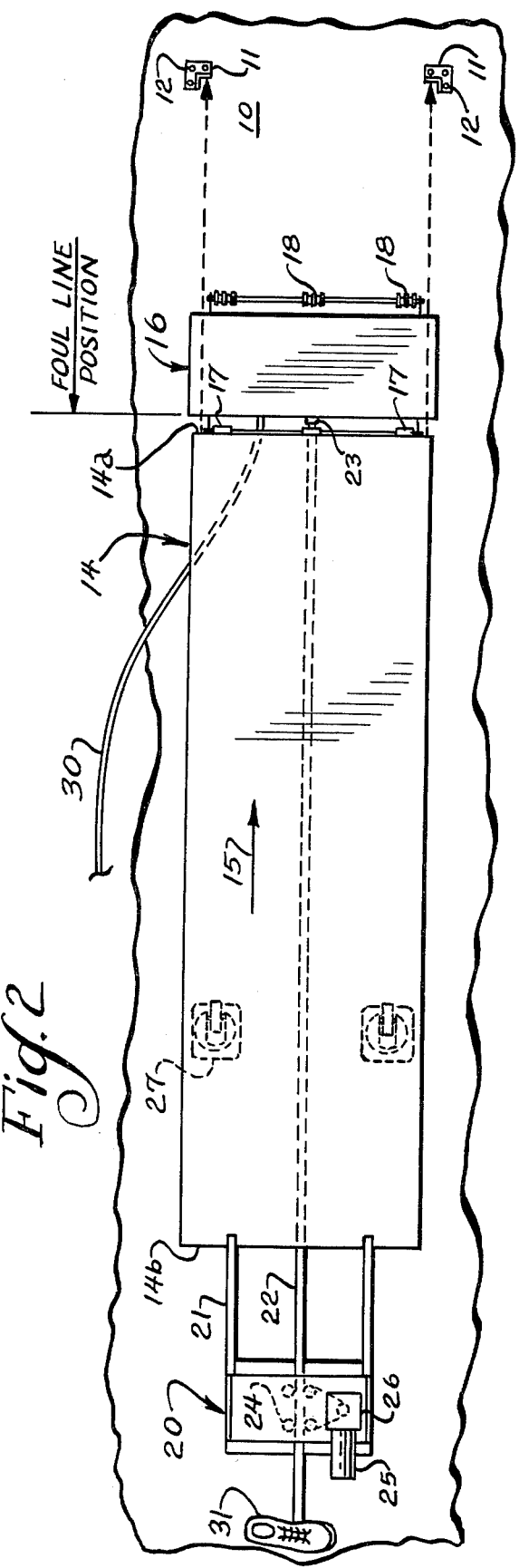

METHOD OF PROVIDING SUB-FLOOR WITH DECORATIVE FLOOR PANELS

BACKGROUND OF THE INVENTION

Many athletic floors, such as basketball floors, volleyball courts, ballroom dance floors, bowling lanes and similar indoor facilities for athletic endeavors, can be provided with a relatively heavy sub-floor and a decorative thin floor covering which contains in printed fashion, all free throw lanes, centerlines, boundaries and other indicia particularly useful to the particular athletic game conducted upon the floor. Additionally, through photographic reproduction processes, a particularly beautiful wooden floor may be photographed and used as a floor covering. Ordinarily, these panels have been made in relatively large sheets, for example, 5 × 12 feet, which are then adhered to the sub-floor to make the finished floor appearance.

One of the problems that has been existent in the adhesive application of decorative floor sheets to a sub-floor has been the difficulty of obtaining a complete bond of the relatively thin laminate throughout its interface with the sub-floor and particularly to obtain a solid overall surface bonding when using adhesives which contain solvents which must be driven out of the adhesive layer in order to make the adhesive perform its intended function. It is extremely important in athletic floors, such as the basketball, volleyball and bowling lane floors, that the laminate has no unadhered areas which would cause the bouncing of the ball or the rolling of the ball to vary from one part of the floor to another.

Workmen employed to apply decorative floor sheets to a sub-floor are also subject to human error in the placement of any one sheet, which in the past could only be replaced by a physical chipping or scraping of the sheet loose from the sub-floor with attendant damage to the sub-floor, requiring repair before a replacement sheet could be applied. Damaged surface sheets can require replacement, particularly in bowling lanes where bowlers may loft the bowling ball beyond the foul line, causing damage to a portion of the lane partway down the lane from the foul line. The General Electric Company has produced a particularly decorative high pressure melamine resin laminate called "Perma-Lane" ®, including an exposed surface appearance of a most beautiful bowling lane of wood. The sheets for use on the bowling lanes thus reproduce a particularly pleasing appearance of wood grain although the laminate is a photographic reproduction of an actual finished wood lane. The problem of removing a single sheet from such a lane and replacing the removed sheet with a new sheet has been troublesome in that it is difficult to chip out one sheet without damage to the adjacent sheets as well as the sub-floor below the damaged sheet. Removal of residual adhesive has also been difficult.

Prior practice followed to lay synthetic plastic laminate materials on bowling lanes has involved the application in the bowling establishment of a chlorinated contact-type adhesive to the uncoated sheets and the sub-floor. Either a roller or spray coating method was used to apply the contact adhesive to the underside of the decorative sheets and over the exposed sub-floor of the lane. These sheets were allowed to remain open for a time so that the solvent, which comprises about 80% of the coating material, could evaporate. Ordinarily, such hand coating resulted in ridges and valleys in the adhesive so that the eventual contact of the laminate onto the sub-floor did not result in 100% contact throughout the mating surfaces. Even under pressure rolling there resulted not enough flow of the adhesive to obtain 100% contact. In addition to this contact problem, the chlorine being heavier than air, presented a problem of exhaustion and removal, many workmen being adversely affected physically by the presence of the chlorine-based solvent. Many other contact adhesives utilize solvents which are either toxic or highly flammable, and thus are quite difficult to use in public places where a floor covering is to be installed.

There has existed a need for an improved method of laying and correcting the laying of decorative floor sheets upon sub-floors for athletic floors, which can eliminate the problems of toxic solvents and eliminate cleanup time for over spray, over rolled and/or accidentally wrongly applied adhesives, and yet provide a solid sounding laminate upon the sub-floor under all conditions of use.

SUMMARY OF THE INVENTION

This invention provides a method of laying a decorative, thin, relatively large, floor panel or sheet upon a sub-floor without requiring coating equipment in the place of installation. At the same time, relatively inexperienced and untrained labor may be utilized in operation of the method, while obtaining a properly aligned and laid complete decorative floor surface.

The method contemplates the use of high compression laminated floor covering sheets which are around one-eighth inch thick and may have on their exposed surfaces a preprinted floor appearance as desired with all markings, line boundaries and such which may be required by the particular athletic floor being provided with the surface panels. The use of the invention method is particularly enhanced by the provision of high viscosity, heat activatable, hot melt adhesives precoated upon the underside of the panels before they are brought to the place of installation. At ambient temperatures the undercoating of adhesive is non-tacky and can be handled by workmen without damage to the undercoat. The adhesive is composed completely of solids and has no solvent. Such panels may be located upon the floor and their position recorded by marking or other means so that the panel may subsequently be manually guided into its properly aligned position upon the sub-floor. Generally, a first properly located panel provides the guide for the laying of subsequent panels into edge abutment with the first laid sheet.

The invention also contemplates the easy removal of a mislaid or damaged panel or sheet, so that it may be easily replaced.

It is the principal object of this invention to provide a method for laying decorative floor panels upon a sub-floor including the removal of a mislaid or damaged panel to prepare for laying of a substitute panel.

It is a further object of this invention to provide a method of laying panels upon an athletic floor while avoiding difficulty with adhesive solvents and avoiding the mis-application of adhesive requiring cleanup following the laying of the decorative sheets.

DESCRIPTION OF THE DRAWINGS

FIG. 1 is a diagrammatic vertical section, through a sub-floor and a decorative panel thereover, diagrammatically illustrating the method of laying the panel upon the floor; and FIG. 2 is a diagrammatic sketch in plan of the floor laying method illustrated in FIG. 1.

DESCRIPTION OF THE PREFERRED EMBODIMENT

The high pressure laminates utilizing a photographic decorative wood surface that are fairly well known have been developed for resurfacing of bowling lanes which require a relatively accurate alignment and laying of the sheets upon a prepared, level, sanded sub-floor. In the past, bowling lanes have been formed of actual wood boards on edge at the lane surface which have been carefully sanded and treated with finishing products to form the actual surface upon which a bowling ball will roll between the foul line and the pin deck.

The methods employed in this invention will be described primarily in laying the decorative sheets for a bowling lane, although it should be understood that the method is equally applicable to the laying of large area sheets upon basketball, volleyball and ballroom floors or any other athletic floor requiring a decorative surface upon which the play is conducted.

In the bowling lane resurfacing, the sub-floor is first prepared by sanding to a desired level condition. The high pressure laminate sheets are precoated with a hot melt (thermoplastic) adhesive of the high viscosity type, such as "P-350" ® obtainable from Pace Incorporated of Northbrook, Illinois. The adhesive has a viscosity of 60,000 to 90,000 centipoises at about 200° C. (375°–400° F. ) as measured by a Brookfield machine. Other hot melt adhesives may be used successfully. Such adhesive is coated uniformly throughout the undersurface of the sheet, which sheets are generally 12 feet long and $41\frac{1}{2} \pm \frac{1}{2}$ inches wide for those parts of the bowling lane from the foul line to the pin deck and 60 inches wide in those portions between the foul line rearwardly over the bowler's approach area. The adhesive is activatable by raising its temperature above 160° F. and generally to the 375°–400° F. condition. When so heated, the adhesive is liquid, will not flow by gravity from the surface of the laminate to which it is precoated, but can be physically migrated so as to be pressed into surfaces of the laminate and the sub-floor. Pressure may be used to cause the adhesive at activating temperature to wet out both surfaces of laminate and sub-floor. The adhesive further produces a mechanical (as opposed to a chemical) bond by reduction of its temperature to the level of 140°–160° F. and below. Once the mechanical bond is set, it is so strong that test pulling of the adhered wood and laminate parts will tear the laminate and the wood prior to any parting within the adhesive layer. Such hot melt adhesives being all solids with no solvent included provides a mechanical bond only by the change in temperature in contrast to the driving out of aqueous or other solvent vehicles contained in other adhesives.

In the resurfacing of a bowling lane, a key sheet is first laid, which key sheet includes the foul line intermediate its 12 foot length. The key sheet with its undercoat of hot melt adhesive may be laid upon the sub-floor and the location thereof carefully recorded that when it is to be pressed down in final position the key sheet may be manually guided to its preselected position. By way of example, a floor 10 properly prepared to receive the laminate can be marked with a pair of metal corner members 11 placed and attached temporarily to the sub-floor by nails 12 so that the laminate sheet 14 may eventually be guided against the corner elements for properly positioning the same in its desired preselected position on the sub-floor.

The process of laying the decorative sheets upon the sub-floor includes an adhesive activating step followed by a pressing of the laminate against the sub-floor while the adhesive is still within its activating temperature range. This may be accomplished by advancing a properly undercoated sheet 14 in the direction of arrow 15 over an electrical radiant heater 16 provided with fore-and-aft rollers 17 and 18 for supporting the sheet slightly out of contact with the heater member 16. The heater rolls over the sub-floor on fore-and-aft rollers 19 supporting the weight of the heater. A motorized pallet 20 is provided with pusher arms 21 to engage the rear sheet edge 14b. Drive rollers 24 run by a variable speed motor 25 through gear box 26 may be utilized to frictionally drive against a rod 22 connected to the heater at 23. The rear of the large sheet may be temporarily supported upon a pair of caster rollers 27 while being moved over the heater. It is preferred to start the undercoated sheet in a position rearwardly of the heater, the heater being placed upon the sub-floor adjacent to the final resting position for the decorative sheet 14. The motor unit 20 may be activated to run the sheet at about 1 to 2 feet per minute rate for the particular heater 16. A larger heater fore-and-aft may allow faster movement. Electrical cables 30 to the heater may extend out from under the sheet rearwardly.

The heater 16 is activated and is capable, if left in one position under the sheet, of raising its temperature to about 700°, but such a temperature rise should be avoided as the laminates and the melamine resins therein may not retain their integrity under such high temperature. In practice, care should be exercised that the exposed surface of the laminate should not exceed a temperature of about 200° F. The advance of the sheet is controlled to heat the adhesive undercoat to the 375°–400° F. level which heat will remain in the adhesive long enough for the sheet to pass over the heater so that its leading edge 14a will get to its proper laying position against the guides 11 attached to the sub-floor. For example, the heater may have an initial position some 30 inches from the corner guides 11. The rollers 17 and 18 keep the adhesive out of contact with the heater by spacing the sheet only about 1 inch or so above the heater. The motorized unit 20 is slidable upon the sub-floor but heavy enough to draw the rod 22 and thus the heater under the sheet. In the first instance, a temporary block 31, which can be a workman's foot, is placed on the sub-floor against the end of the rod 22 so that the motorized unit, its pusher arms and the sheet will be advanced over the heater. When the leading edge 14a reaches its final resting position on the sub-floor, a weighted roller is used to press that end of the sheet against the sub-floor and simultaneously the blocking element 31 is removed from the rod so that the motorized unit will stand still on the sub-floor and start pulling the heater under the sheet to continue the activation of the adhesive. As the heater progresses along under the sheet, the temporary support casters 27 are removed manually and additional areas of the sheet are continued to be pressed upon the sub-floor until the heater exits out from under the sheet, whereupon the entire sheet will be pressed to the sub-floor. The push rods 21 are generally selected to be $1\frac{1}{2}$ times longer than the width of the heater element 16 so that there is adequate space between the trailing edge 14b of the sheet and the motorized unit 20 for pulling the heater completely out from under the sheet.

It has been found that a heater about 1½ or 2 inches thick provided with radiant electrical elements is sufficient for the purpose. The decorative sheet is only a few inches above the sub-floor allowing little heat loss by convection which aids in retaining the activated temperature in the adhesive until the leading edge and subsequent areas of the sheet may be pressed to the sub-floor. It does not require a considerable length of time to cool the adhesive to its bonding temperature since the sub-floor acts as a heat receptor or heat sink, extracting heat from the adhesive so that its temperature will be lowered in a few minutes to about 150° F. level and thus set up its mechanical bonding. Since the adhhesive undercoat on the decorative sheet may be applied in a factory remote from the installation place, there is no cleanup following the application nor any spilling of adhesive beyond the area of the sheet itself. Once the first sheet, which would be the key sheet in laying a bowling lane covering, is laid down and adhered to the sub-floor, subsequent sheets may be end edge abutted with the first sheet to provide for proper alignment. A heat probe ahead of the heater may be used to automatically vary the motor 25 speed insuring that proper adhesive activating temperature is achieved. Experience has indicated that the temperature at the exposed sheet decorative surface will seldom exceed 170° F., well within the ability of melamine resin laminates to retain integrity. In the event that there has been any heat loss at the edges of the sheet such that complete mechanical bond does not occur, auxiliary heating of the edge areas of the sheet may be accomplished through the laminate to raise the adhesive thereunder to activating temperature. Care should be exercised not to heat the surface of the laminate in excess of about 200° F.

In the event that a sheet is adhered incorrectly in position, it may be easily removed. The heater 16 as used for laying a sheet is supported on the sub-floor by rollers 19 fore and aft. The heater may be inverted to be supported upon the upper rollers 17 and 18 which would now roll over a laid sheet to heat through the laminate to the underlying adhesive layer. In the case of a high viscosity hot melt adhered sheet, sufficient heat should be placed into the adhesive layer to raise its temperature above the bonding temperature whereupon the hot melt adhesive becomes sufficiently liquid for workmen to grasp the edges of the sheet and to raise the same as the heater progresses over the sheet from one end to another. Such raising must be done because the hot melt adhesive will return to its bonding temperature and mechanically bond once it cools to the level of about 150° to 160° F. In the case of a decorative sheet which has been laid with a contact-type adhesive, heating the same with the heater through the laminate will partially destroy the bond of the contact adhesive. In such case, the laminate may also be manually raised as the heater passes over the sheet to physically break the contact adhesive bond. Thereafter, the adhesive will not re-bond should the sheet be left in its original position for later removal. It is only necessary after raising such a sheet to clean up the residual adhesive from the sub-floor in order to relay a new or replacement sheet in place of that removed. Solvents would be needed to clean up contact adhesive; heat alone needs to be used with the hot melt adhesive. The procedure of using the heat to remove a damaged or mislaid sheet avoids the difficulty heretofore encountered in having to chip and scrape a damaged sheet off of the floor, with damage to the floor itself which often requires repair before a new sheet could be laid.

It is contemplated that in the case of basketball floors, the boundary lines, as well as a decorative center medallion and foul lines could be provided on decorative sheets numbered for indication of proper laying upon a sub-floor. The boundary of a volleyball court could also be provided in the decorative sheets before laying. In the case of bowling lanes, all marks are photographically reproduced and printed in the laminate during its manufacture, the sheets being properly numbered for laying upon a sub-floor of the lane.

Some floor covering materials are sufficiently flexible to permit their manufacture in long lengths, which are conveniently rolled for delivery to establishments in which the installation is to occur. Such roll material may also utilize the methods and processes herein described with the addition of a roll stand to support the roll material as it is fed toward the floor over the heater element in a controlled timed fashion to activate the hot melt adhesive. Such roll material is preferably coated on its underside with the high viscosity hot melt adhesive in a factory location away from the establishment in which material is to be adhered to a sub-floor. This can be conveniently accomplished in view of the fact that the adhesive is non-tacky at room temperatures and does require activation through the application of heat to the temperatures previously specified.

It may be convenient in handling roll material that the heater and roll stand supported upon rollers be coupled together so that the material is fed over the heater from the roll supply at a proper speed to permit its application to the floor while the adhesive temperature is within the activation range. It is contemplated that quite long rolls, for example 100 feet of material, could be handled in this fashion. The decorative sheets thus may be of any desired length, such as the 10 or 12 foot long sheets, or a sheet which is of much greater length due to its flexibility permitting rolling of the same and the feeding of the sheet from the roll as it is required to be passed over the heater and onto the sub-floor.

An additional advantage of the present system, as compared with manually laying sheets with contact adhesives, is in the end to end abutment of the sheets without leaving expansion grooves. Since the hot melt adhesive coated sheets are heated to a temperature generally well above any future expected ambient temperature, just prior to laying upon the sub-floor, all expansion of the sheet has occurred at the instant of laying edge to edge abutment, leaving no gap or groove is thus possible and desired. Cleaning compounds used periodically thereafter will have no avenue to penetrate to the adhesive layer between sheet edges. Additionally, the hot melt adhesive effectively seals the joint between sheets preventing intrusion of cleaning liquids.

I claim:

1. A method of laying decorative surface panels upon a sub-floor with bond throughout the interface of panel and sub-floor, comprising the steps of:
providing a thin decorative floor panel with a complete surface covering undercoat of high viscosity, heat-activatable, hot melt adhesive;
designating a desired final position on the sub-floor for the panel;

placing the panel adhesive side down in an initial position partially above the final position on the sub-floor with one edge of the panel spaced from such final position;

placing a radiant heater on the sub-floor between said one edge of the panel and said designated final position on said sub-floor, with heater elements as wide as the panel and directed upwardly;

activating the heater and directing the panel with said one edge first over the heater, longitudinally relatively moving the panel and heater at a selected controlled movement rate to heat the adhesive to activating temperature, said movement being selected to move the panel from initial to final position;

and pressing the panel upon the sub-floor starting at said one edge properly positioned at the desired final position and progressing across the panel as the panel exits over the heater.

2. A method of laying decorative surface panels upon a sub-floor with bond throughout the interface of panel and sub-floor, comprising the steps of:

providing a thin decorative floor panel with a complete surface covering undercoat of high viscosity, heat-activatable, hot melt adhesive;

choosing a final position on the sub-floor desired for final bonded location of the panel;

placing the panel adhesive side down over the sub-floor adjacent its final position;

placing a radiant heater on the sub-floor between one panel edge and the position of such edge in such final bonded location;

gradually moving the panel over the heater toward its final location, such one edge first, to progressively raise the adhesive to activating temperature;

contacting the one panel edge to the sub-floor when the panel edge reaches its desired final location and pressing the adjacent portions of the panel against the sub-floor, continuing relative movement of the panel and heater to exit the panel over the heater with the adhesive activated and progressively continuing pressing the exited panel portions onto the sub-floor until the entire panel is bonded to the sub-floor.

3. A method of bonding a decorative floor covering sheet to a sub-floor comprising the steps of:

providing a decorative sheet with full covering undercoat of high viscosity, heat activatable, hot melt adhesive;

locating a so undercoated sheet, adhesive side down in tandem with a radiant heater with upwardly facing heater elements, both sheet and heater being adjacent to a desired bonded location for the sheet upon the sub-floor;

effecting a selected rate relative movement of the heater and sheet one end first travelling over the heater to raise the adhesive to activating temperature;

setting down said one heated end of the sheet to the sub-floor in said desired location and progressively pressing the sheet to the sub-floor from said one end across the sheet as exited over the heater while heat in the adhesive is reduced to below bonding temperature.

4. The method of bonding a decorative floor covering sheet to a sub-floor as specified in claim 3 including the further steps of:

locating a second undercoated sheet and the heater in tandem on the sub-floor adjacent to the first bonded sheet, travelling the second sheet and heater at the selected rate of relative movement to bring a heated end of the second sheet into abutment and alignment with the first bonded sheet and setting the second sheet to the sub-floor as specified for the first sheet and bonding sheets subsequent to the second in the manner of said laying and bonding of the second sheet, each sheet being abutted and aligned with the immediately prior laid sheet.

5. The method of claim 3 including the steps of:

realigning a decorative floor covering sheet bonded in undesired position on the sub-floor including inverting the heater, progressing the heater over the exposed surface of the bonded sheet to raise the temperature of the adhesive between the sheet and sub-floor to above bonding temperature and manually progressively raising the sheet as the adhesive releases its bond.

6. The method of laying decorative surface panels upon an athletic floor.

providing an adhesive layer of high viscosity hot melt adhesive that is non-tacky and solid at ambient temperature upon a thin panel of decorative floor covering of less area than the athletic floor to be covered, placing a heater upon the area of the floor to be occupied by the floor covering panel, placing the panel over the floor adhesive side down with one end adjacent the heater and the balance of the panel extending away from the heater, activating the heater and advancing the panel bodily one end first over the heater at a movement rate to heat the hot melt adhesive layer to above 160° F. and no more than about 400° F., continuing the panel advancing until one heated end arrives at a predetermined properly aligned laying position and thereupon stopping the panel advancing and simultaneously beginning movement of the heater in a direction away from the heated end at said same movement rate, gradually pressing the panel upon the floor beginning at said one end as the panel exits over the heater and continuing movement of the heater to a position out from under the panel and pressing the whole of the panel upon the floor until the temperature of the adhesive reduces below about 150° F.

7. A method of laying decorative surface panels upon an athletic sub-floor in total bonded relation throughout the interface of panel and sub-floor, comprising:

providing thin decorative surface panels with an undercoat of high viscosity hot melt adhesive, locating a laying position on the sub-floor for one desired end and lateral edges of a first panel to be adhered to the sub-floor, temporarily supporting a first panel over the sub-floor, adhesive side down in spaced tandem relation to said desired laying position, placing a radiant heater across the sub-floor between the temporarily supported panel and said laying position with the heater directed upwardly, activating the heater and providing a controlled relative rate of movement between panel and heater to raise the adhesive temperature to activating temperature of between 160° F. and 400° F. as the panel moves over the heater.

moving the leading end of the panel over and beyond the heater to bring the leading end and lateral edges of the panel into alignment with the one desired end and lateral edges of said laying position, pressing the leading end of the panel to the sub-floor at the desired laying position and continuing said relative movement at the controlled rate while pressing succeeding heated portions of the panel onto the sub-floor until the heater is out from under the panel and the entire panel is bonded to the sub-floor, and advancing a second panel in like manner over the heater into edge abutment with said first panel to align the second panel on the sub-floor.

8. A method of laying a new decorative sheet upon an existing sub-floor having old decorative sheets thereon, including the steps of:

progressively moving a radiant heater from one end over the length of an old sheet with the heater elements facing downwardly to direct heat through the old sheet raising the adhesive thereunder to a release temperature, progressively manually raising the old sheet from said sub-floor one end first until the whole sheet is removed from the sub-floor, cleaning any residual adhesive from the sub-floor over the area previously occupied by the removed sheet, providing a new decorative-surface floor covering sheet for bonding to the sub-floor in said area, with an undercoat of high-viscosity, heat activatable, hot melt adhesive, placing the heater, elements facing upwardly, and the new sheet, adhesive undercoat facing downwardly, in tandem adjacent said area of the floor, providing a relative movement of the heater and new sheet starting with one end of the sheet passing over the heater at a selected controlled movement rate to raise the adhesive to an activating temperature, guiding said one end of the new sheet into proper alignment in the area on the sub-floor and progressively pressing the sheet to the sub-floor area beginning at said one end and continuing over the length of the sheet as the sheet exits the heater until the adhesive has reduced to bonding temperature.

9. A method of laying thin, stiff material, decorative floor covering sheets upon a sub-floor with adhesive bond throughout sub-floor and covering sheet interface, comprising the steps of:

providing the sheet with an undercoat of high viscosity, heat activatable, hot melt adhesive which is non-tacky at room temperature, becomes activated at an elevated temperature and mechanically bonds at a temperature therebetween;

placing the sheet in desired laying position on the sub-floor and recording such position;

then removing the sheet to a position spaced from said desired position;

running the sheet adhesive side down over a heat source activating the adhesive;

guiding the sheet into desired laying position while the adhesive is still activated; and pressing the sheet to the sub-floor until the adhesive cools to below bonding temperature.

10. The method specified in claim 9 including the steps of guiding sheets laid subsequently to the first, into edge abutment with the first sheet to obtain the desired laying position of such subsequent sheets.

* * * * *